US 9,319,578 B2

(12) United States Patent
Jiang et al.

(10) Patent No.: US 9,319,578 B2
(45) Date of Patent: Apr. 19, 2016

(54) RESOLUTION AND FOCUS ENHANCEMENT

(71) Applicants: Hong Jiang, Warren, NJ (US); Gang Huang, Monroe Township, NJ (US); Kim N. Matthews, Watchung, NJ (US); Paul A. Wilford, Bernardsville, NJ (US)

(72) Inventors: Hong Jiang, Warren, NJ (US); Gang Huang, Monroe Township, NJ (US); Kim N. Matthews, Watchung, NJ (US); Paul A. Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 436 days.

(21) Appl. No.: 13/658,904

(22) Filed: Oct. 24, 2012

(65) Prior Publication Data

US 2014/0112594 A1   Apr. 24, 2014

(51) Int. Cl.
G06K 9/40 (2006.01)
H04N 5/232 (2006.01)
G06T 5/00 (2006.01)

(52) U.S. Cl.
CPC ............ H04N 5/23212 (2013.01); G06T 5/003 (2013.01); H04N 5/23229 (2013.01); H04N 5/23235 (2013.01)

(58) Field of Classification Search
CPC ................ G06T 5/003; G06T 2200/21; G06T 2207/20021; G06T 2207/20201; G06T 7/0069
See application file for complete search history.

(56) References Cited

U.S. PATENT DOCUMENTS

| 3,775,602 | A | 11/1973 | Alexandridis et al. |
| 5,070,403 | A | 12/1991 | Wilkinson |
| 5,166,788 | A | 11/1992 | Lee |
| 5,262,854 | A | 11/1993 | Ng |
| 5,519,206 | A | 5/1996 | Uwira |
| 5,555,023 | A | 9/1996 | Maenaka et al. |
| 5,572,552 | A | 11/1996 | Dent et al. |
| 5,870,144 | A | 2/1999 | Guerrera |
| 6,057,909 | A * | 5/2000 | Yahav et al. ................ 356/5.04 |
| 6,148,107 | A | 11/2000 | Ducloux et al. |
| 6,271,876 | B1 | 8/2001 | McIntyre et al. |
| 6,356,324 | B1 | 3/2002 | Nishiguchi et al. |
| 6,718,287 | B2 | 4/2004 | Oostveen et al. |
| 7,345,603 | B1 | 3/2008 | Wood et al. |
| 7,602,183 | B2 | 10/2009 | Lustig et al. |

(Continued)

FOREIGN PATENT DOCUMENTS

| JP | 2008028538 A | 2/2008 |
| JP | 2011166255 A | 8/2011 |

(Continued)

OTHER PUBLICATIONS

Wikipedia article on "Shutter (photography)", dated Oct. 5, 2011.*

(Continued)

Primary Examiner — Stephen R Koziol
Assistant Examiner — Jonathan S Lee
(74) Attorney, Agent, or Firm — Carlson, Gaskey & Olds, P.C.

(57) ABSTRACT

An exemplary system includes at least one detector configured to provide an output based on a detected input. A plurality of input control elements control the input detected by the detector. A processor is configured to determine at least one point spread function based on a condition of the detector, a condition of the input control elements and a selected distance associated with the output. The controller is configured to generate data based on the output and the at least one point spread function, the generated data having at least one aspect 20 Claims, 2 Drawing Sheets

(56) References Cited

U.S. PATENT DOCUMENTS

| | | | |
|---|---|---|---|
| 7,680,356 | B2 | 3/2010 | Boyce et al. |
| 7,928,893 | B2 | 4/2011 | Baraniuk et al. |
| 8,125,883 | B2 | 2/2012 | Aulin |
| 8,204,126 | B2 | 6/2012 | Tsuda et al. |
| 8,644,376 | B2 | 2/2014 | Jiang et al. |
| 2003/0002746 | A1 | 1/2003 | Kusaka |
| 2003/0043918 | A1 | 3/2003 | Jiang et al. |
| 2003/0197898 | A1 | 10/2003 | Battiato et al. |
| 2004/0174434 | A1 | 9/2004 | Walker et al. |
| 2004/0264580 | A1 | 12/2004 | Chiang Wei Yin et al. |
| 2005/0207498 | A1 | 9/2005 | Vitali et al. |
| 2006/0157640 | A1 | 7/2006 | Perlman et al. |
| 2006/0203904 | A1 | 9/2006 | Lee |
| 2006/0239336 | A1 | 10/2006 | Baraniuk et al. |
| 2007/0009169 | A1* | 1/2007 | Bhattacharjya ............... 382/255 |
| 2007/0285554 | A1 | 12/2007 | Givon |
| 2008/0025624 | A1 | 1/2008 | Brady |
| 2008/0062287 | A1* | 3/2008 | Agrawal et al. ............... 348/241 |
| 2008/0152296 | A1 | 6/2008 | Oh et al. |
| 2009/0066818 | A1* | 3/2009 | Lim et al. ....................... 348/252 |
| 2009/0095912 | A1 | 4/2009 | Slinger et al. |
| 2009/0136148 | A1 | 5/2009 | Lim et al. |
| 2010/0091134 | A1 | 4/2010 | Cooke et al. |
| 2010/0111368 | A1* | 5/2010 | Watanabe ..................... 382/106 |
| 2010/0165163 | A1 | 7/2010 | Matsuda |
| 2010/0189172 | A1 | 7/2010 | Pateux et al. |
| 2010/0201865 | A1 | 8/2010 | Han et al. |
| 2011/0150084 | A1 | 6/2011 | Choi et al. |
| 2011/0150087 | A1 | 6/2011 | Kim et al. |
| 2011/0157393 | A1 | 6/2011 | Zomet et al. |
| 2011/0199492 | A1* | 8/2011 | Kauker ................... G06T 5/003 348/208.1 |
| 2012/0057072 | A1* | 3/2012 | Yamashita ......... H04N 5/23212 348/349 |
| 2012/0069209 | A1 | 3/2012 | Gudlavalleti et al. |
| 2012/0076362 | A1* | 3/2012 | Kane et al. .................... 382/106 |
| 2012/0082208 | A1 | 4/2012 | Jiang et al. |
| 2012/0105655 | A1 | 5/2012 | Ishii et al. |
| 2012/0189047 | A1 | 7/2012 | Jiang et al. |
| 2012/0213270 | A1 | 8/2012 | Baraniuk et al. |
| 2013/0002968 | A1 | 1/2013 | Bridge et al. |
| 2013/0070138 | A1 | 3/2013 | Baraniuk et al. |
| 2015/0049210 | A1 | 2/2015 | Rachlin et al. |

FOREIGN PATENT DOCUMENTS

| | | |
|---|---|---|
| WO | 2006041219 A2 | 4/2006 |
| WO | 2012001463 A1 | 1/2012 |
| WO | 2013007272 A1 | 1/2013 |

OTHER PUBLICATIONS

International Search Report and Written Opinion of the International Searching Authority for International Application No. PCT/US2013/064962 dated Dec. 16, 2013.

Huang, et al., "Lensless Imaging by Compressive Sensing," accepted for presentation at IEEE International Conference on Image Processing, ICIP 2013, May 2013.

Jiang, et al., "Multi-View in Lensless Compressive Imaging," Picture Coding Symposium 2013, Dec. 2013.

Candes, et al., "Stable Signal Recovery From Incomplete and Inaccurate Measurements," Applied and Computational Mathematics, Caltech, Pasadena, CA 91125; Department of Mathematics, University of California, Los Angeles, CA 90095, Feb. 2005; Revised Jun. 2005, pp. 1-15.

Chan, et al., "A Single-Pixel Terahertz Imaging System Based on Compressed Sensing, " Applied Physics Letters, vol. 93, No. 12, pp. 121105-121105-3, Sep. 2008.

Park, et al., "A Geometric Approach to Multi-View Compressive Imaging," EURASIP Journal on Advances in Signal Processing 2012, pp. 1-15, http://asp.eurasipjournals.com/content/201211137.

Zomet, et al., "Lensless Imaging With a Controllable Aperture," IEEE Conference on Computer Vision and Pattern Recognition (CVPR), Jun. 2006, 0-7695-2597-0/06.

Heidari, et al., "A 2D Camera Design With a Single-Pixel Detector," in IRMMW-THz 2009, IEEE, pp. 1-2, 2009.

Takhar, et al., "A New Compressive Imaging Camera Architecture Using Optical-Domain Compression," Proc. IS&T/SPIE Computational Imaging IV, Jan. 2006.

Jiang, et al., "Surveillance Video Processing Using Compressive Sensing, " Manuscript submitted to AIMS' Journals, pp. 1-1, arXiv:1302.1942v1 [cs.CV] Feb. 8, 2013.

Romberg, "Imaging Via Compressive Sampling," IEEE Signal Processing Magazine, pp. 14-20, Mar. 2008.

Babacan, et al., "Compressive Passive Millimeter-Wave Imaging," 2011 18th IEEE International Conference on Impage Processing, pp. 2705-2708.

Duarte, et al., "Single-Pixel Imaging Via Compressive Sampling," IEEE Signal Processing Magazine, vol. 25, No. 2, pp. 83-91, Mar. 1, 2008, XP011225667.

Goyal, et al., "Compressive Sampling and Lossy Compression," IEEE Signal Processing Magazine, pp. 48-56, Mar. 2008.

Jiang, et al., "Scalable Video Coding Using Compressive Sensing," Bell Labs Technical Journal, vol. 16, No. 4, pp. 149-169, 2012.

Li, et al., "A New Compressive Video Sensing Framework for Mobile Broadcast," IEEE Transactions on Broadcasting, vol. 59, No. 1, Mar. 2013.

Donoho, "Compressed Sensing," IEEE Transactions on Information Theory, vol. 52, No. 4, Apr. 2006.

Robucci, et al., "Compressive Sensing on a CMOS Separable-Transform Image Sensor," vol. 98, No. 6, Jun. 2010, Proceedings of the IEEE, pp. 1089-1101.

International Search Report and Written Opinion of the International Searching Authority for International application No. PCT/US2011/051730 mailed Dec. 15, 2011.

International Search Report and Written Opinion of the International Searching Authority for International application No. PCT/US2011/051726 mailed Nov. 14, 2011.

Cossalter, et al., "Joint Compressive Video Coding and Analysis," IEEE Transactions on Multimedia, IEEE Service Center, Piscataway, NJ, US vol. 12, No. 3, Apr. 1, 2010, pp. 168-183, XLP011346672.

Dadkhah, et al., "Compressive Sensing With Modified Total Variation Minimization Algorithm," Acoustic Speech and Signal Processing (ICASSP), 2010 IEEE International Conference on, IEEE, Piscataway, NJ, US, Mar. 14, 2010, pp. 1310-1313, XP031697373.

Huihui, et al., "Compressive Sensing for DCT Image," Computational Aspects of Social Networks (CASON), 2010 International Conference on, IEEE, Piscataway, NJ, US, Sep. 26, 2010, pp. 378-381.

Chengbo Li, "An Efficient Algorithm for Total Variation Regularization With Applications to the Single Pixel Camera and Compressive Sensing," Thesis Submitted in Partial Fulfillment of the Requirement for the Degree Master of Arts, Sep. 20, 2009, pp. 1-93, XP55010819, Retrieved from the internet: URL:http://scholarship.rice.edu/bitstream/handle/1911/62229/1486057.PDR?sequence=1 (Retrieved Oct. 31, 2011).

Li, et al., "Video Coding Using Compressive Sensing for Wireless Communications," Wireless Communications and Networking Conference (WCNC), 2011 IEEE, IEEE, Mar. 28, 2011., pp. 2077-2082, XP031876593.

Jiang, et al., "Arbitrary Resolution Video Coding Using Compressive Sampling, "Workshop on Picture Coding and Image Processing 2010, Dec. 7, 2010, pp. 1-8, XP030082080.

Park, et al., "A Multiscale Framework for Compressive Sensing of Video," in Picture Coding Simposium, Chicago, IL, May 2009, 4 pages.

Drori, Iddo, "Compressed Video Sensing," BMVA symposium on 3D video analysis, display, and applications, 2008, two pages.

Wakin, et al., "Compressive Imaging for Video Representation and Coding," in Picture Coding Symposium (Beijing, China), Apr. 2006, six pages.

Dugad, et al., "A Fast Scheme for Image Size Change in the Compressed Domain," IEEE Transactions on Circuits and Systems for Video Technology, vol. 11, No. 4, Apr. 1, 2011, pp. 461-474.

(56) References Cited

OTHER PUBLICATIONS

Deng, et al., "Robust Image Compression Based on Compressive Sensing," Multimedia and Expo (ICME), Jul. 19, 2012, pp. 462-467.
Hyder, et al., "A Scalable Distributed Video Coder Using Compressed Sensing," India conference, Dec. 8, 2009, pp. 1-4.
Gao, et al., "A Robust Image Transmission Scheme for Wireless Channels Based on Compressive Sensing," Aug. 18, 2012, pp. 334-341.
CCD and CMOS Sensor Technology, 2010, AXIS Communications, pp. 1-8.
Bogaerts, et al., "High-End CMOS Active Pixel Sensors for Space-Borne Imaging Instruments," 2005, FillFactory, pp. 109.
Doering, Roger William, "A Tri-Color-Pixel Digital-Micromirror Video Chip," A2001, UCLA, pp. 1-180.
Ouni, et al., "New Low Complexity DCT Based Video Compression Method," 2009, ICT 09, pp. 202-207.
Turchetta, et al., "Monolithic Active Pixel Sensors (MAPS) in a VLSI CMOS Technology," 2003, Science Direct, pp. 251-259.
Park, Sahng-Gyu, "Adaptive Lossless Video Compression," A Thesis Submitted to the Faculty of Purdue University in Partial Fulfillment of the Requirements for the Degree of Doctor of Philosophy, Dec. 2003, pp. 1-105.
Robucci, et al., "Compressive Sensing on a CMOS Separable Transform Image Sensor," School of Electrical and Computer engineering, Atlanta, GA, 2008 IEEE, pp. 5125-5128.
Raskar, et al., "Coded Exposure Photography: Motion Deblurring Using Fluttered Shutter," ACM Transactions on Graphics, vol. 25, No. 3, Jul. 1, 2006, pp. 795-804, XP002467982, ISSN: 0730-0301, DOI: 10.1145/1141911/1141957.
Wang, et al., "Optical Engineering: Superresolution Imaging by Dynamic Single-Pixel Compressive Sensing System," Optical Engineering, Soc. Of Photo-Optical Instrumentation Engineers, Bellingham, vol. 52, No. 6, Jun. 1, 2013, p. 63201, XP060025857, ISSN: 0091-3286, DOI: 10.1117/1.OE.52.6.063201.
Shi, et al., "High Resolution Image Reconstruction: A New Imager Via Movable Random Exposure," 16th IEEE International Conference on Image Processing, 2009, IEEE, Piscataway, NJ, Nov. 7, 2009, pp. 1177-1180, XP031628383, DOI: 10.1109/ICIP.2009.5413684, ISBN: 978-1-4244-5653-6.
International Search Report for International application No. PCT/US2015/035979 dated Sep. 8, 2015.

* cited by examiner

RESOLUTION AND FOCUS ENHANCEMENT

TECHNICAL FIELD

This disclosure generally relates to processing detector output. More particularly, this disclosure relates to devices and methods for altering a resolution or focus of a detector output.

DESCRIPTION OF THE RELATED ART

Various devices are known for detecting a selected input. For example, a variety of cameras and other imaging devices are used for image acquisition. Conventional cameras were, for many years, based on capturing images on film. More recently, devices such as cameras have included digital imaging components. Many contemporary digital image or video devices are configured for acquiring and compressing large amounts of raw image or video data.

One drawback associated with many digital systems is that they require significant computational capabilities. Another potential drawback is that multiple expensive sensors may be required. Efforts to increase the resolution of detecting devices such as cameras typically include adding more components to obtain more pixels for an image. It is typically not desirable to increase the cost or complexity of a device by introducing additional components. Moreover, many scenarios may include physical and practical limitations that prevent a desired detection or image gathering capability.

SUMMARY

An exemplary system includes at least one detector configured to provide an output based on a detected input. A plurality of input control elements control the input detected by the detector. A processor is configured to determine at least one point spread function based on a condition of the detector, a condition of the input control elements and a selected distance associated with the output. The controller is configured to generate data based on the output and the at least one point spread function, the generated data having at least one aspect.

An exemplary detector output enhancement method includes determining an output of at least one detector. The output is dependent on a condition of a plurality of input control elements configured to control input detected by the detector. At least one point spread function is determined based on a condition of the detector, a condition of the input control elements and a selected distance associated with the output. Data is generated based on the output and the at least one point spread function, the generated data having at least one aspect.

Various embodiments and their features will become apparent to those skilled in the art from the following detailed description of an exemplary embodiment. The drawings that accompany the detailed description can be briefly described as follows.

DETAILED DESCRIPTION

Figure 1:
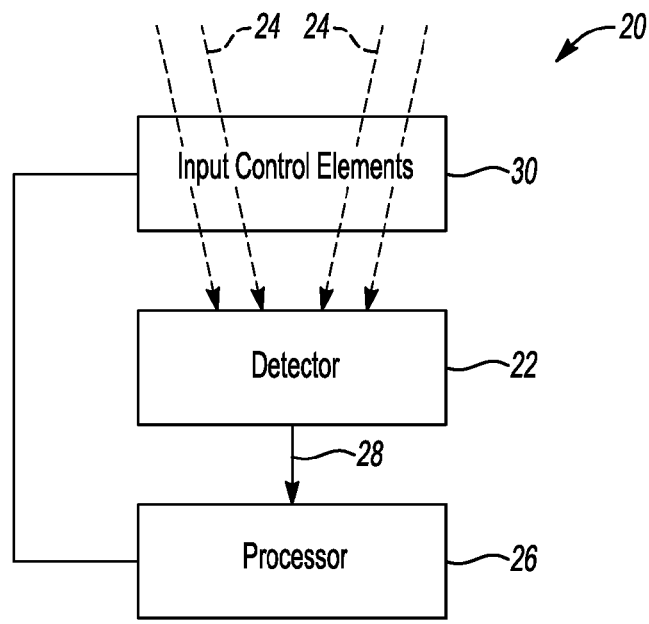
FIG. 1 schematically illustrates an example detecting system.

FIG. 1 schematically illustrates an example detecting system 20. At least one detector 22 is configured to detect some input schematically shown at 24. Example inputs may include radiation of various types, light, sound or other detectable phenomenon. A processor 26 is configured to determine at least one point spread function and to use that point spread function for generating data based on an output 28 of the detector 22 and the point spread function. The generated data has at least one selected aspect, such as a resolution or focus of the data. The processor 26 utilizes the output 28, the at least one point spread function and information regarding a condition of the detector 22 and a condition of a plurality of input control elements 30 that control the input 24 that is detectable by the detector 22.

In one example, the processor 26 is configured to achieve a selected resolution of the data. In another example, the processor 26 is configured to achieve a selected focus of the data. In another example, the processor 26 is configured to achieve a selected resolution and focus of the generated data. In the following description, the generated data comprises an image and the processor 26 is capable of achieving a desired resolution of the image, a desired focus of the image or both.

Figure 2:
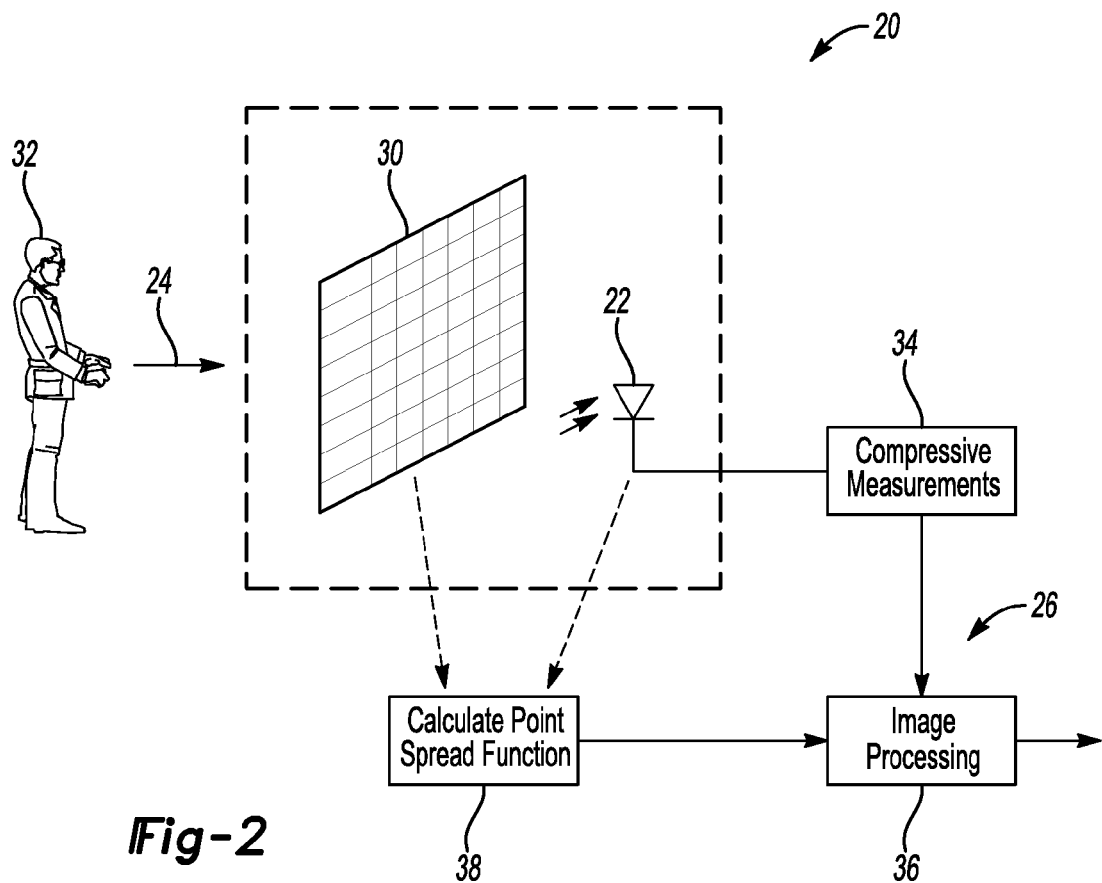
FIG. 2 schematically illustrates another example detecting system.

FIG. 2 schematically illustrates one particular example detecting system 20 that is configured as a lensless imaging device or camera. In this example, the detector 22 comprises a photon detector or other detector that is capable of detecting light. In this example, the input control elements 30 comprise a plurality of shutter elements in a shutter array. In one example, the shutter elements 30 are opened or closed for purposes of allowing light to be incident on the detector 22. In another example, the shutter elements 30 comprise a micro mirror array of individual mirror elements that are selectively controllable to selectively reflect light within the field of view of the detector 22.

In the example of FIG. 2, the detector output provides information for generating an image of an object 32. As schematically shown at 34, the processor 26 uses a known compressive measurement technique and the output from the detector 22 for purposes of generating and processing an image as schematically shown at 36. One example includes using a known compressive measurement and image generating technique.

The processor 26 is configured to generate the image with at least one selected aspect. The processor 26 in the illustrated example is configured to achieve a desired or selected resolution of the image. The processor 26 is capable of enhancing the resolution of the image beyond the resolution that is provided by the physical limitations of the shutter array 30. As schematically shown at 38, the processor 26 uses at least one point spread function associated with at least one of the shutter elements 30 for purposes of enhancing the resolution of the image.

There are known techniques for determining a point spread function. For example, the detector output, the detector size, a distance between the detector 22 and the shutter elements 30, a distance to the object 32 and the dimensions or size of the shutter elements provides enough information to determine a point spread function. In this example, a point spread function may be determined for each shutter element utilized at a particular instant for gathering image data.

Figure 3:
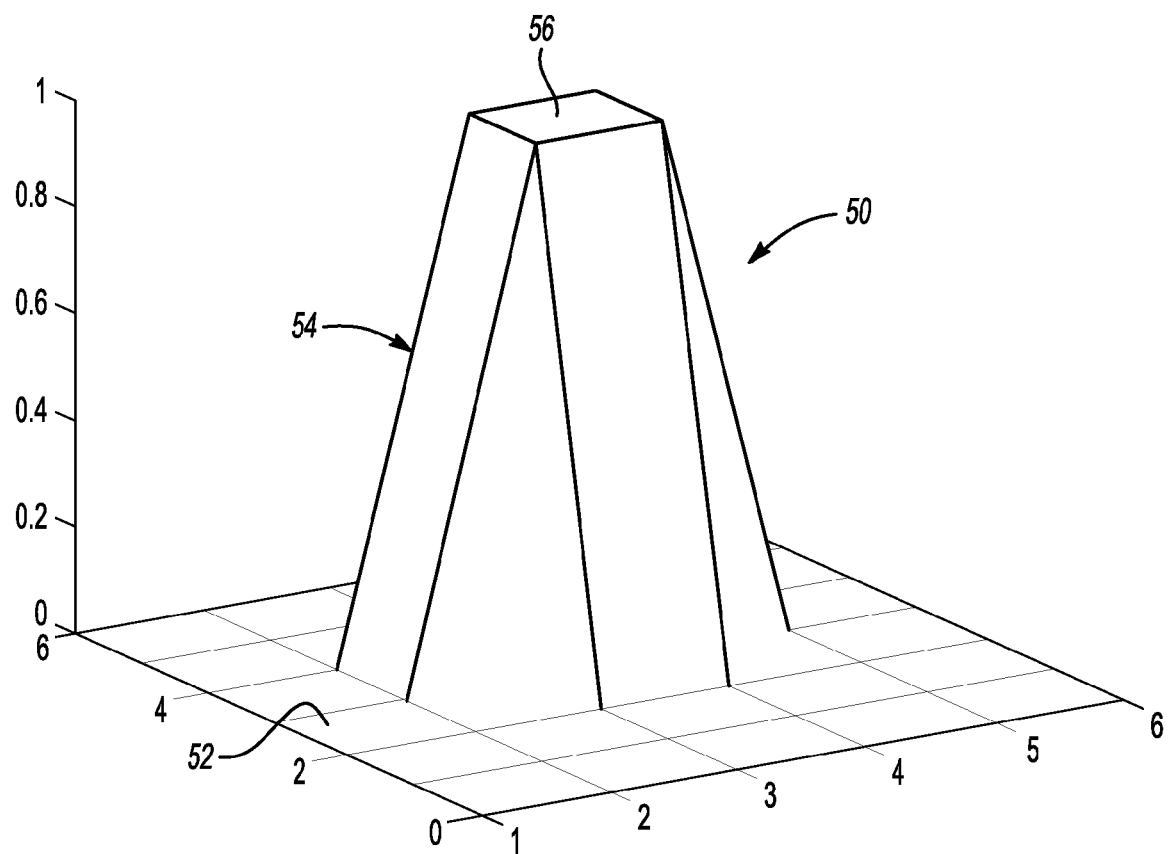
FIG. 3 schematically illustrates example information used for processing a detector output.

FIG. 3 is a graphical illustration 50 of image information 52 and a point spread function 54. As can be appreciated from FIG. 3, the point spread function 54 has a constant value along a region or area 56. In one example, the controller 26 uses information regarding the region 56 where the point spread function has a constant value for purposes of enhancing the resolution of the image.

For purposes of discussion, let $I(x,y)$ be the image 52, j be an index of the input control (i.e., shutter) elements 30 and $g_j(x,y)$ be the point spread function associated with each shutter element 30. In examples where there are multiple detectors, i may be the index for each detector and $y_n$ are the measurements made by the detectors. In such a case the measurements made by the plurality of detectors can be described by the following equation.

$$y_n = \Sigma a_{nj} \int g_j(x,y) I(x,dxdy), \quad (1)$$

which can be rewritten as $$y_n = \int G_n(x,y) I(x,y) dxdy \quad (2)$$

where $G_n(x,y) = \Sigma_j a_{nj} g_j(x,y)$, which is referred to as a collective point spread function associated with all of the shutter elements 30 that were open or active during the detector measurements.

In this example the processor reconstructs the image with finer resolution according to the following $$I(x,y) = \mathrm{argmin}\{\int |W(I(x,y))| dxdy | \int G_n(x,y) I(x,y) dxdy = y_n, n=1,2\ldots\} \quad (3)$$

where W is a sparsifying operator. Reconstructing the image in this way allows for achieving a selected resolution of the image. Any desired resolution may be obtained by quantizing x,y and replacing integration with summation in equation (3).

The maximum resolution possible with this technique is based upon the region 56 where the collective point spread function $G_n(x,y)$ has a constant value. The minimum resolution pixel size of the image is determined by the region 56. Selecting a finer resolution (i.e., a pixel size smaller than the region 56) does not provide any additional information because the collective point spread function has a constant value within the region 56.

It is desirable to utilize the region 56 for an increased resolution because the point spread function has a constant value in that region. If the point spread function does not have a constant value over a given region, the image information may be blurred based on the information from the detector in that region.

In examples wherein the processor 26 is also capable of adjusting a focus of the image, the processor 26 utilizes a point spread function to achieve a desired focus the image, for example, on a selected object within the image. Given information regarding a distance between a particular object and the sensor, the processor 26 is able to determine a point spread function that is based upon the distance to that object. Utilizing that point spread function for reconstructing the image focuses the image on the object associated with that point spread function.

In the illustrated example, the detecting system 20 comprises a compressive measurement camera that measures visual information whether for a still image or moving video (e.g., a sequence of images). The output 28 of the detector 22 may be stored in various manners in a selected location, which may be remote from the detector 22. The measured visual information are later used by the processor 26, which may be located remotely from the detector 22 or incorporated into the same device, to reconstruct the image (or video). The processor 26 uses an appropriate point spread function that depends on the geometry or condition of the compressive measurement camera and the desired focal point of the image (or video) being reconstructed (or generated). This approach allows for achieving a selected resolution of the image (or video), a selected focus of the image (or video), or both.

The preceding description is exemplary rather than limiting in nature. Variations and modifications to the disclosed examples may become apparent to those skilled in the art that do not necessarily depart from the essence of the disclosed embodiments. The scope of legal protection can only be determined by studying the following claims.

We claim:

1. A system, comprising:
   at least one detector configured to provide an output based on a detected input;
   a plurality of input control elements configured to control the input detected by the detector, wherein the plurality of input control elements comprises a plurality of shutter elements configured to selectively allow the detector to detect light; and
   a processor configured to
   determine a plurality of point spread functions based on a condition of the detector, a condition of the input control elements and a selected distance associated with the output, wherein the plurality of point spread functions are respectively associated with respective ones of the control elements and
   generate data based on the output and the plurality of point spread functions, the generated data having at least one aspect, wherein the at least one aspect comprises a selected resolution or an enhanced resolution.

2. The system of claim 1, wherein
   the resolution is based on the plurality of point spread functions.

3. The system of claim 2, wherein the resolution is finer than a base resolution provided by the plurality of input control elements.

4. The system of claim 1, wherein
   the at least one aspect comprises a selected focus.

5. The system of claim 1, wherein
   the detector is configured to detect light reflected from at least one object; and
   the generated data comprises an image.

6. The system of claim 5, wherein the processor is configured to
   determine a collective point spread function from the plurality of point spread functions, each of the plurality of point spread functions being associated with a respective one of the shutter elements; and
   generate the image with the enhanced resolution based upon the collective point spread function.

7. The system of claim 6, wherein the enhanced resolution of the image has a resolution that is finer than a resolution of the plurality of shutter elements.

8. The system of claim 6, wherein the processor is configured to
   determine a portion of the collective point spread function having a constant value; and
   generate the image with the enhanced resolution based on the portion having the constant value.

9. The system of claim 5, wherein the processor is configured to
   determine the at least one point spread function based on a distance between the detector and at least one object in the image; and
   use the at least one point spread function to achieve a selected focus of the image.

10. The system of claim 8, wherein the processor is configured to improve a focus on the object in the image.

11. A method of enhancing a detector output, comprising the steps of:
    determining an output of at least one detector, the output being dependent on a condition of a plurality of input control elements configured to control input detected by the detector, wherein the plurality of input control elements comprises a plurality of shutter elements configured to selectively allow the detector to detect light;

determining a plurality of point spread functions based on a condition of the input control elements and a selected distance associated with the output, the plurality of point spread functions being respectively associated with a respective one of the control elements, and generated data base on the output and the plurality of point spread functions, the generated data having at least one aspect, wherein the at least one aspect comprises a selected resolution or an enhance resolution.

12. The method of claim 11, comprising generating the data having the selected resolution based on the plurality of point spread functions.

13. The method of claim 12, wherein the selected resolution is finer than a base resolution provided by the plurality of input control elements.

14. The method of claim 11, wherein the at least one aspect comprises a selected focus.

15. The method of claim 11, wherein
the detector is configured to detect light reflected from at least one object; and
the generated data comprises an image.

16. The method of claim 15, comprising
determining a collective point spread function from the plurality of point spread functions; and
generating an enhanced resolution of the image based upon the collective point spread function.

17. The method of claim 16, wherein the enhanced resolution of the image has a resolution that is finer than a resolution of the plurality of shutter elements.

18. The method of claim 16, comprising
determining a portion of the collective point spread function having a constant value; and
generating the enhanced resolution based on the portion having the constant value.

19. The method of claim 15, comprising
determining the at least one point spread function based on a distance between the detector and at least one object in the image; and
using the at least one point spread function to achieve a selected focus of the image.

20. The method of claim 18, comprising improving a focus on the object in the image.

* * * * *